Sept. 22, 1970 W. BEZDEL 3,530,243

APPARATUS FOR ANALYZING COMPLEX SIGNAL WAVEFORMS

Filed May 10, 1968 5 Sheets-Sheet 1

Inventor
WINCENTY BEZDEL
By Charles L. Johnson Jr.
Attorney

Inventor
WINCENTY BEZDEL
By Charles L. Johnson Jr.
Attorney

APPARATUS FOR ANALYZING COMPLEX SIGNAL WAVEFORMS

Filed May 10, 1968

Inventor
WINCENTY BEZDEL
By Charles L. Johnson Jr.
Attorney

Inventor
WINCENTY BEZDEL
By Charles L. Johnson Jr.
Attorney

Inventor
WINCENTY BEZDEL
By Charles L. Johnson, Jr.
Attorney

United States Patent Office 3,530,243

Patented Sept. 22, 1970

3,530,243

APPARATUS FOR ANALYZING COMPLEX SIGNAL WAVEFORMS

Wincenty Bezdel, Harlow, England, assignor to Standard Telephones and Cables Limited, London, England, a British company Filed May 10, 1968, Ser. No. 728,146
Claims priority, application Great Britain, June 23, 1967, 29,100/67
Int. Cl. G10l 1/00
U.S. Cl. 179—1 4 Claims

ABSTRACT OF THE DISCLOSURE

Circuits are provided for detecting different sound classes by measuring the rate at which zero crossings characterising these sounds occur and producing outputs proportional to their difference. Means are provided for automatically altering the boundaries of the sound ranges and the thresholds in the detectors.

This invention relates to apparatus for analysing complex signal waveforms. Such apparatus is being developed for a number of purposes, for example, speech recognition, but whatever the application it is necessary for the apparatus to be able to recognise a wide variety of versions of the same characteristic pattern or patterns.

In the case of speech recognition it must cope with different voices and different accents. The same word said by the same person in different contexts can sound different.

Several ways of analysing the patterns of complex waveforms have been proposed, for example examination of the frequency spectrum reveals important characteristic patterns in the case of speech. One method that has been proposed is, in effect, a digital processing technique. This method makes use of the information contained in the zero-crossing (ZC) of the waveform. Such information is derived from the points at which the waveform crosses the zero reference level and changes from negative to positive and vice versa. The distance between successive zero crossing, or the number of ZC intervals in a given period, is an indication of the frequency of the waveform at that time.

Speech can be divided into different classes of sounds, for example back vowels, front vowels, fricatives, plosives etc. Some classes of sounds are more important than others in recognising speech. Several classes of sounds can be defined in terms of zero-crossing distribution over a frequency range. Thus a frequency range of 200–1200 c./s. may be interpreted as being indicative of vowel sounds, and the zero crossing distribution within this range may be used to classify them. This invention is particularly concerned with discerning the presence of different classes of sounds in a speech waveform.

According to the invention there is provided apparatus for analysing complex signal waveforms containing characteristic zero crossing distribution including means for dividing the signal spectrum into two or more frequency ranges, means for differentiating between samples of the waveform falling within each frequency range and means for making a decision as to which sample dominates.

In a preferred embodiment the apparatus includes means for altering the boundaries of the frequency ranges according to the cumulative significance of the information contained within the frequency ranges.

The apparatus may additionally include means for varying a threshold or reference level for one frequency range relative to the corresponding level for a second frequency range in response to the detection of a sound in the second range, in order to facilitate the detection of a low level output in the first range in the presence of a high level output in the second range.

In order that the above and other features of the invention may be more readily understood and carried into effect embodiments thereof will now be described with reference to the accompanying drawings, in which.

The apparatus to be described uses the techniques of zero-crossing analysis and enables the circuits to be constructed for digital rather than analogue operations. Thus the identification of different sounds is based on the classification of zero-crossing intervals into different ranges. For example zero-crossing intervals which fall within the range 0.5 to 1.0 millisecond are equivalent to a waveform of frequency 1000 to 500 c./s. A circuit which is designed to select only zero-crossing in that range can be termed a digital filter.

Figure 1:
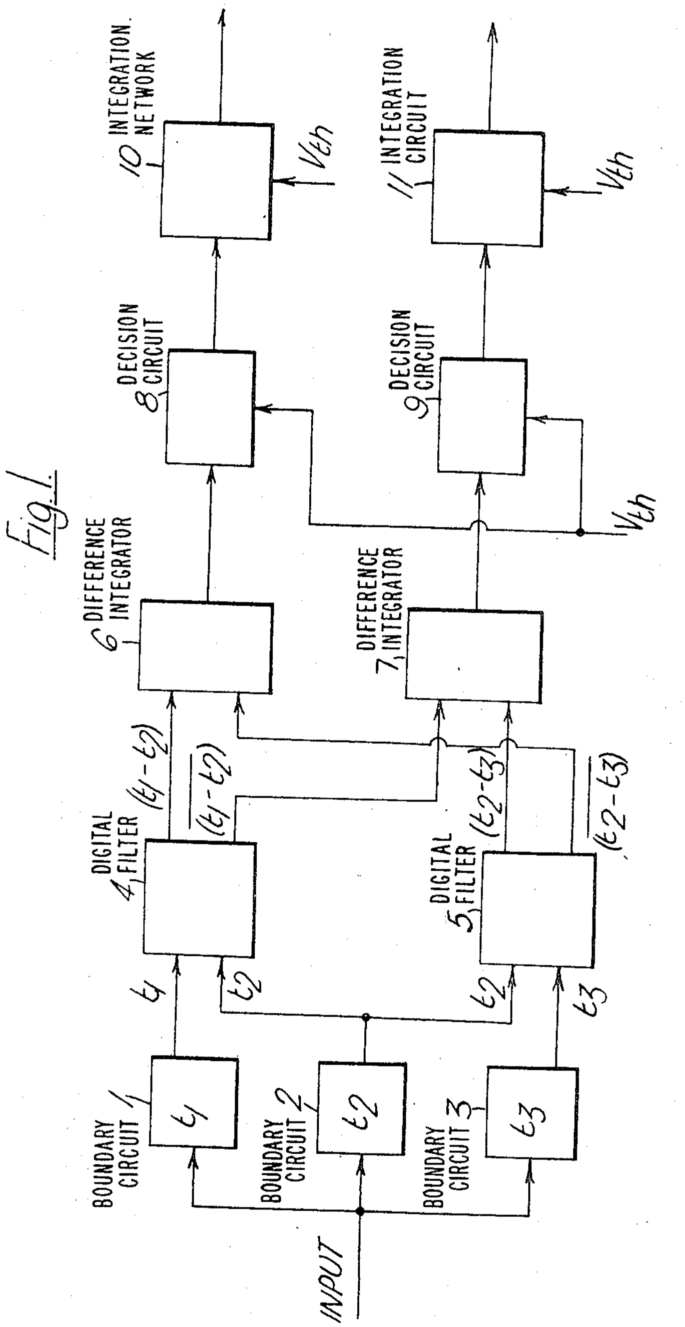
FIG. 1 is a block schematic of a speech recognising apparatus arranged to identify two classes of sounds.

In the arrangement shown in FIG. 1 the incoming speech wave is first of all fed to a number of frequency range selectors or boundary circuits 1, 2, 3 as they will be called. The functon of these boundary circuits 1, 2, 3 is to set the range boundaries within which the subsequent equipments will operate. For example it may be that the equipment is required to identify two sounds, one falling in the range 200–600 c./s. and the other falling in the range 600–1200 c./s. The boundaries to be set therefore are at 200 c./s., 600 c./s. and 1200 c./s. These boundaries, when considered in terms of zero-crossing intervals, can be defined in terms of time, for example a zero-crossing falling within the interval $t_1—t_2$ lies in the higher frequency range while a zero-crossing falling in the interval $t_2—t_3$ lies in the lower frequency range. These time intervals are with reference to $t_0$ which is the time of the preceding zero-crossing. Thus in FIG. 1 circuit 1 is used to set a boundary at time $t_1$, circuit 2 sets a boundary at time $t_2$ and circuit 3 at time $t_3$. The zero-crossings falling within the channel boundaries are detected and isolated by the digital filter circuits 4, 5. The outputs of the filters 4, 5 are streams of pulses characterising the two sounds, and these pulse streams are applied to difference integrator circuits 6, 7 where the weighted difference, integrated over a period of time, between the filter outputs is obtained.

The weighted differences are then applied to binary decision circuits 8, 9 which are arranged to give outputs indicative of the largest of the difference integrated inputs provided these exceed a given minimum threshold $V_{th}$.

Further processing is necessary to remove uncertainties when the outputs of the decision circuits 8 or 9 are interrupted thus indicating that some other sound or sounds have been detected. This is accomplished by inserting weighted integration networks 10, 11 in the outputs of the binary decision circuits 8, 9.

The circuits used in the block diagram of FIG. 1 will now be described in detail. The boundary circuits 1, 2 and 3 are basically the circuit of FIG. 2. The incoming waveform has already been passed through a zero-crossing detector (not shown) which generates trigger pulses at the ZC intervals. Conveniently these pulses are obtained by squaring the analogue waveform and driving a bistable with the squared wave. Both bistable outputs are to be used and so a mixing circuit is needed to obtain trigger pulses of the correct polarity. These trigger pulses are then used to drive a first monostable to generate sample pulses. The time of the trailing edge of the sample pulse is $t_0$—the duration of the pulse is small compared to the shortest zero-crossing interval to be considered. A second monostable driven by the first monostable produces reset pulses.

Figure 2:
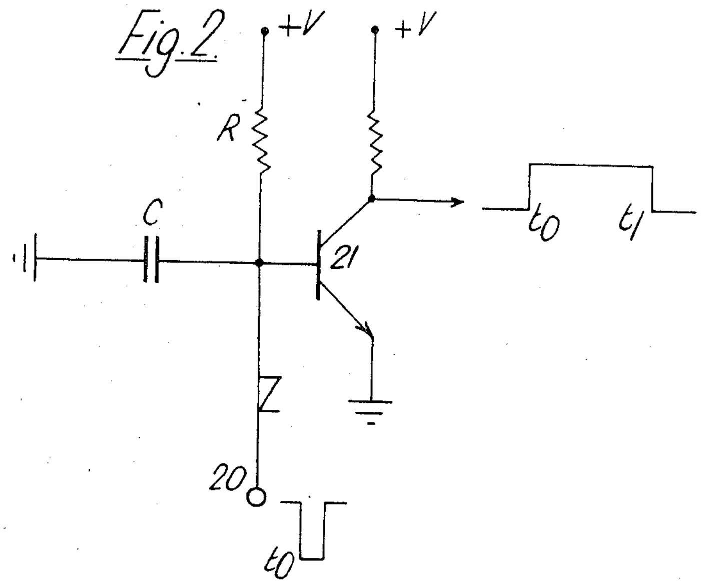
FIG. 2 is a circuit designed to provide a boundary for a frequency range.

FIG. 2 is basically a monostable circuit with a time constant governed by an RC network. The sample pulses are applied to terminal 20 so as to switch off transistor 21 at time $t_0$. If no further zero-crossings are detected within the period $t_0-t_1$ the transistor will switch on again at time $t_1$ due to the action of the RC network. If, however, another zero-crossing occurs within the period $t_0-t_1$ the partially discharged RC network will be recharged and the transistor will remain off. Thus any zero-crossing occurring after $t_1$ will cause the circuit of FIG. 2 to generate an output at time $t_1$. This is basically the boundary circuit 1 of FIG. 1.

Boundary circuits 2 and 3 are similar to that described except that circuit 2 has a time constant $t_0-t_2$ and circuit 3 has a time constant $t_0-t_3$.

Figure 3:
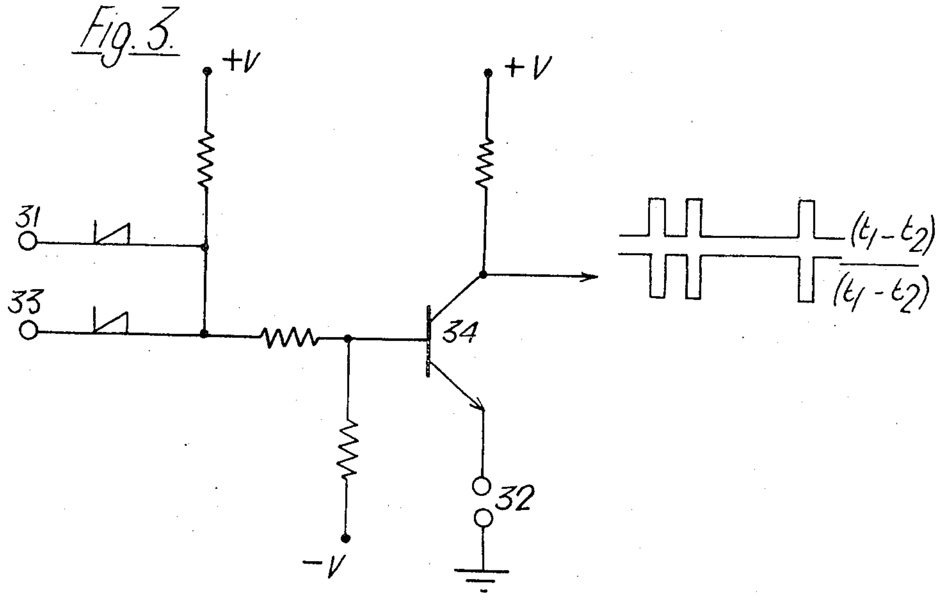
FIG. 3 is a circuit designed to provide a digital filter for a frequency range.

FIG. 3 shows the basic digital filter circuits 4, 5 of FIG. 1. Each circuit has two inputs 31, 32 from, in the case of circuit 4, boundary circuits 1 and 2 respectively. The digital filter is also supplied with the ZC sample pulses at terminal 33. The circuit acts as a gate. Transistor 34 is maintained in the off condition by the bias voltages in the absence of any inputs to terminals 31, 32 and 33. ZC sample pulses applied to terminal 33 will coincide with an output from circuit 1 at terminal 31 if the interval from the preceding zero-crossing exceeds the period $t_1$ and this, together with the absence of input at terminal 32 allows the transistor 34 to switch on for the duration of the ZC sample pulse. If however the interval exceeds the period $t_2$ then the output from circuit 1 will have ceased and instead an output from circuit 2 will be delivered at terminal 32 preventing the transistor from switching on when the ZC sample pulse appears. The output of the circuit of FIG. 3 is thus a stream of pulses occurring whenever a zero-crossing falls within the period $t_1-t_2$ from the preceding zero-crossing.

Circuit 5 of FIG. 1 is similar to circuit 4 except that it has as inputs the outputs of circuits 2 and 3. The output of circuit 5 is therefore a stream of pulses occurring whenever a zero-crossing falls within the period $t_2-t_3$ after the preceding zero-crossing.

Figure 4:
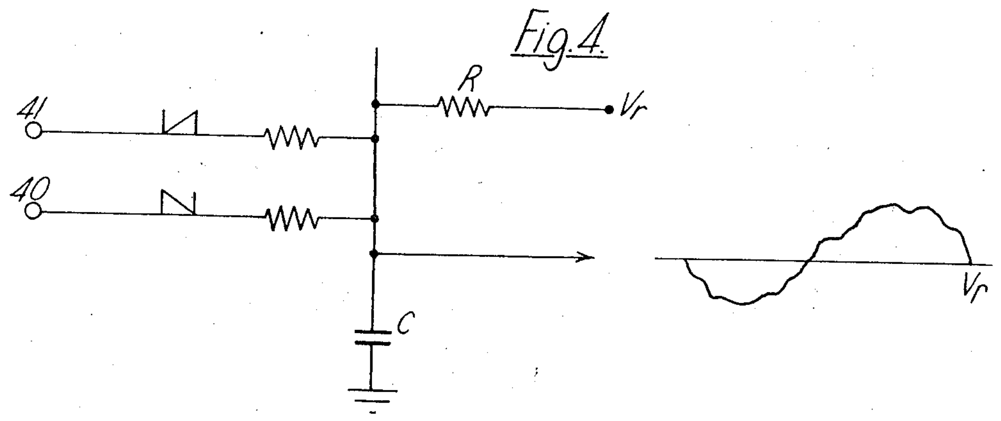
FIG. 4 is a circuit for a difference rate measurement integrated over a period of time of the outputs of two digital filter circuits shown in FIG. 3.

The outputs of circuits 4 and 5 in FIG. 1 can be regarded as indicative of the presence of a particular ZC distribution appearing in the waveform. Since however the waveform is complex it may be that no one output appears exclusively. To determine whether an output is significant it is necessary to differentiate between them. This is accomplished by circuits 6 and 7 in FIG. 1 which are each basically the circuit of FIG. 4. The output of circuit 4 which signifies the occurrence of zero-crossings in the period $t_1-t_2$ is applied to terminal 40. The output of circuit 5, which signifies the occurrence of zero-crossings in the period $(t_2-t_3)$ is required to be subtracted from the output of circuit 4. Therefore a negative version of the output of circuit 5 is applied to terminal 41. The rate of the stream of output pulses from circuit 4, characterising a particular pattern, is measured by charging an RC circuit. The input $(t_1-t_2)$ from circuit 4 charges the circuit and the input $\overline{(t_2-t_3)}$ discharges the circuit. It will be appreciated that the circuit will be charged significantly only if the $(t_1-t_2)$ input is predominantly greater than the $\overline{(t_2-t_3)}$ input. Thus only a significant pattern appearing in the waveform will produce an output which surmounts a reference voltage $V_r$ which can be set to give the required reference level. Circuit 7 is similar to circuit 6 but has inputs marked $(t_2-t_3)$ and $\overline{(t_1-t_2)}$ respectively.

Figure 5:
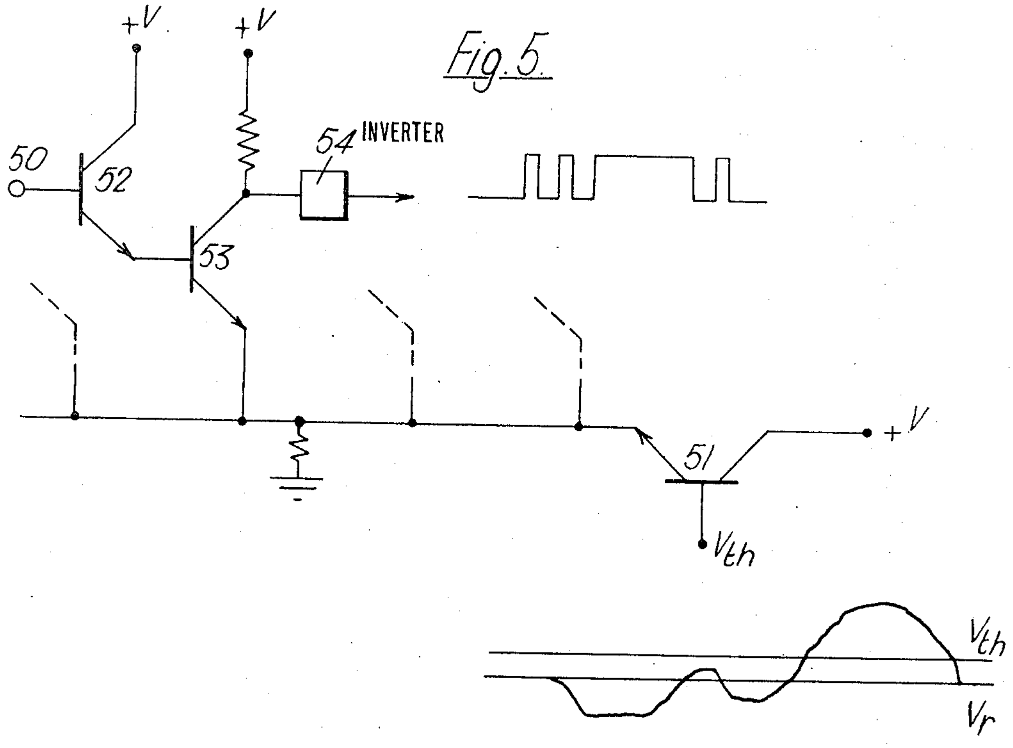
FIG. 5 is a circuit for detecting the highest output and minimum difference rates out of a number of classes of sounds.

The outputs of the difference integrator circuits 6 and 7 are then applied to binary decision circuits 8, 9 which are basically as shown in FIG. 5. These simply give a binary output when the difference-integrated signal exceeds a predetermined threshold level which may be the same for all the decision circuits. Each decision circuit receives as its input at terminal 50 the difference integrated signal. It also receives a common threshold voltage determined by the base voltage $V_{th}$ via transistor 51. The input 50 is to transistor 52 which is in turn connected to an emitter follower transistor 53. When the input 50 rises above the threshold voltage transistor 53 conducts, if its input at terminal 50 is the highest of all the other inputs, and delivers a binary output. An inverter circuit 54 which also provides gain may be required in the output of the circuit to satisfy the requirements of succeeding stages. The binary output in effect indicates the presence or absence of a particular ZC distribution. FIG. 5 shows how other corresponding binary decision circuits such as 9 in FIG. 1 are connected to the common $V_{th}$ source.

Figure 6:
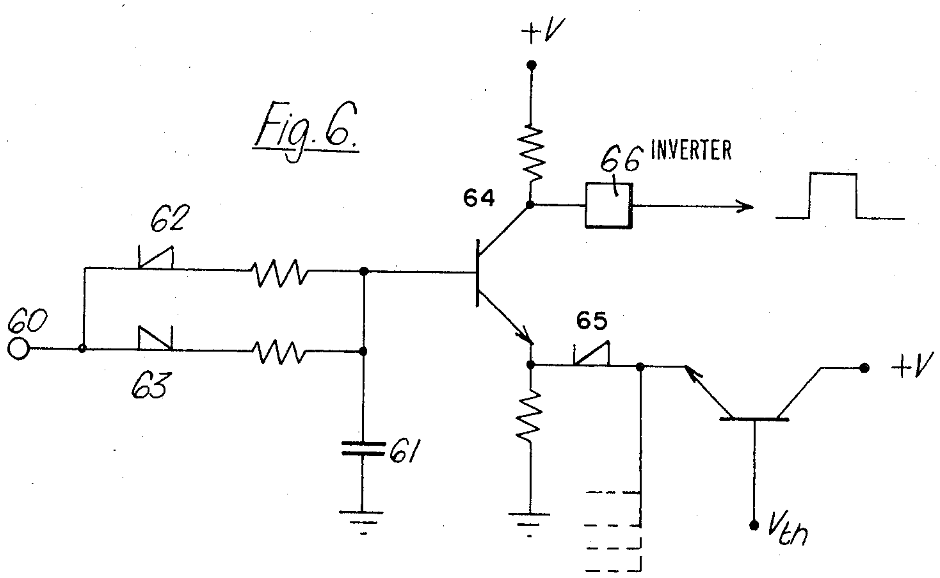
FIG. 6 is an integrating circuit for a detected sound output.

Finally, to remove uncertainties when the binary decision outputs are briefly interrupted, thus indicating that some other classes of sounds may have been detected briefly, they are integrated and the integrated output is again compared with a threshold to ensure the significance of the output. The necessary circuits 10, 11 in FIG. 1 are as shown in FIG. 6. Again, all the integrator circuits can have the same threshold voltage $V_{th}$ which may be the same as that for circuits 8 and 9. The binary decision input is applied to terminal 60 and charges the capacitor 61 via diode 62 when the pattern is present and discharges it via diode 63 when the pattern is absent. The voltage on capacitor 61 controls transistor 64 which switches on when the integrated input rises above $V_{th}$. Other corresponding integrating circuits are connected as indicated by the dotted lines. The output from the integrating circuit is a pulse registering the significant appearance over a period of time of a particular ZC distribution.

Figure 7:
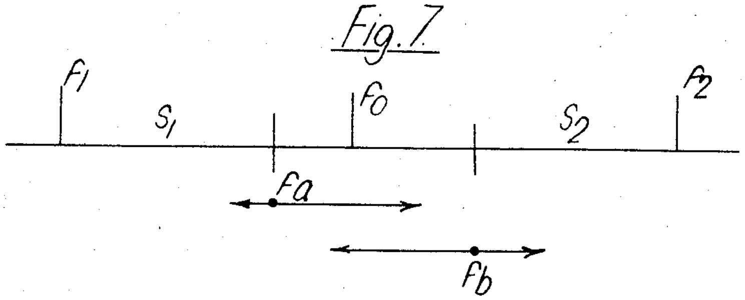
FIG. 7 illustrates graphically how frequency range boundaries may be altered relative to one another.

Since the recognition of classes of sounds in the speech waveform depends largely on the significance of the observed ZC distributions (represented by voltage on the capacitor of FIG. 4) it is desirable to modify the apparatus so that its discrimination varies with the significance of the emergent ZC distributions. Thus as the significance of a particular distribution increases it is desirable to extend the limits of the frequency range within which that distribution may reasonably occur. Conversely the limits should be reduced as the distribution significance decreases. In the present case these effects are achieved by modifying the delay circuits which provides the channel boundaries $t_1$, $t_2$ and $t_3$. FIG. 7 illustrates how the channel boundaries are moved according to the change in significance of the detected ZC distribution. Consider first that in the arrangement of FIG. 1 the two ZC distributions to be detected are $S_1$ and $S_2$ falling within the frequency ranges $f_1-f_0$ and $f_0-f_2$ respectively, where $f_0$ is the central boundary separating the two distributions. In practice it may be advisable to limit the initial detection of $S_1$ to the frequency range $f_1-f_2$. However, after a short while it may become apparent that $S_1$ is present. Having established the presence of $S_1$ it is advantageous to move the boundary $f_a$ to the right, thereby increasing the frequency range within which $S_1$ may occur. The reason for restricting the range initially is to lessen the possibility of confusion in the vicinity of $f_0$ as to the presence of $S_1$ by imposing a more rigorous requirement on the detection of its characteristic pattern. Once this distribution is being detected then it is possible to allow a relaxation of this requirement thereby obtaining more information from the frequency range in the vicinity of $f_0$ proportionally to the output characterising the distribution. Similar treatment is given to the range $f_b-f_2$ containing the pattern $S_2$.

Figure 8:
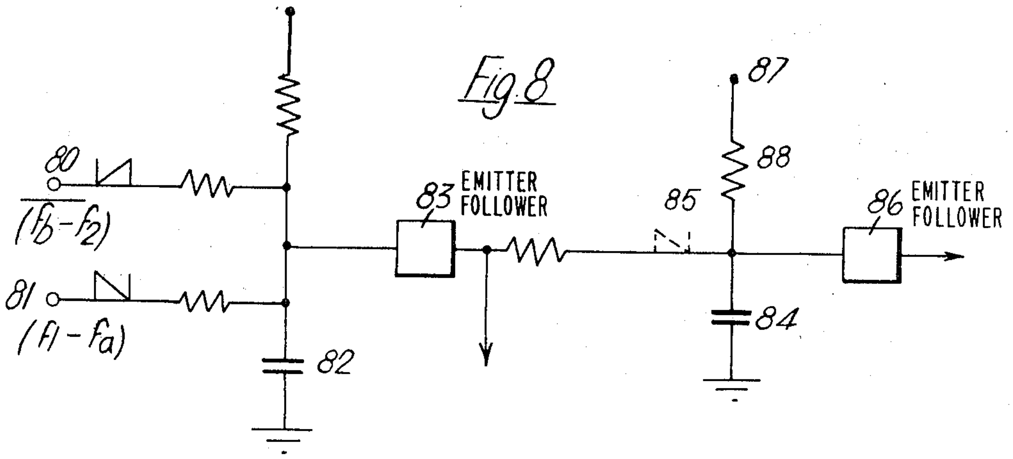
FIG. 8 is a circuit designed to alter a boundary of one frequency range according to the significance of the information contained in that range.

The circuit for achieving the alteration of the boundaries is shown in FIG. 8. The first part of FIG. 8 is similar in fact to FIG. 4, the difference integrating circuit, and has the same inputs as FIG. 4, to the terminals 80, 81. The voltage on capacitor 82 will reflect the relative levels of information in the two frequency ranges $f_1-f_a$ and $f_b-f_2$. This voltage is applied, via the right hand portion of the circuit to control the movement of boundary $f_a$. The voltage on capacitor 82 is integrated on the capacitor 84 and the integrated voltage is applied to terminal 22 in FIG. 2. Variation of the voltage at terminal 22 causes a corresponding variation in the time constant of the boundary circuit, i.e. it will vary the time $t_2$. The polarity of the output of FIG. 8 is arranged so that as the integrated voltage on capacitor 84 rises, the time constant of the circuit of FIG. 2 is decreased and vice versa. In the arrangement of FIG. 1 there is only one boundary circuit producing $t_2$ for both channels. Under these circumstances any increase in one frequency range must result in a corresponding decrease in the other frequency range. If two boundary circuits are provided for $t_2$ ($t_a$ and $t_b$ corresponding to $f_a$ and $f_b$) then it is possible to vary each boundary movement independently of the other.

It may be that movement of a boundary in one direction only is required. In that case the circuit of FIG. 8 is modified by the addition of a diode 85 as shown in dotted lines. The direction of connection of the diode will determine in which direction the boundary is prevented from moving by blocking off the appropriate voltage output from the capacitor 82.

Another advantage of the circuit of FIG. 8 is that the voltage applied to terminal 87 via resistance 88 sets the base position for $f_a$. Alteration of this voltage alters the base position of $f_a$ and provides a ready means of presetting the circuit for different types of talker, e.g. male and female voices. This presetting can be accomplished by the talker as required.

Figure 9:
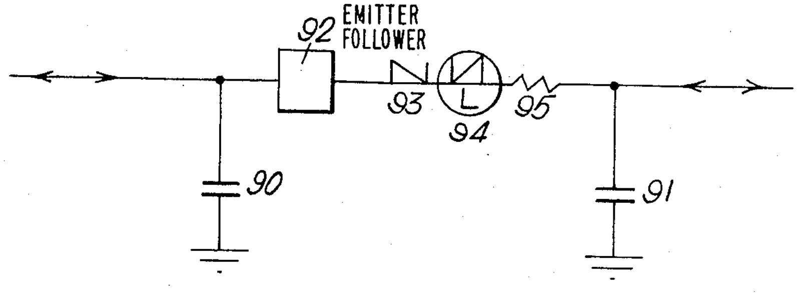
FIG. 9 is a circuit for varying the threshold or reference level of two sound detectors relative to one another.

In some cases it may happen that during transitions of sounds one of them may produce a low level output compared with the other sounds and thus may not be detected. For example, in the sequence of $S_1$ followed by $S_2$ and $S_1$ again, if $S_2$ produces low level output compared with $S_1$ it may not be detected. This can be overcome by adjusting continuously the reference level of the difference integrating circuits 6, 7 according to the level of the individual patterns detected. For example, if a high level output in the range $t_1-t_2$ is detected the reference level of circuit 7 is raised by circuit 6 making it easier for a low level output in the range $t_2-t_3$ to produce an output from circuit 7. The circuit for achieving this is shown in FIG. 9. Capacitor 90 is the capacitor of the circuit shown in FIG. 4, corresponding to circuit 6 of FIG. 1 and capacitor 91 is the equivalent capacitor of circuit 7 of FIG. 1. The two capacitors 90 and 91 are connected by an emitter follower stage 92, a diode 93, a Zener diode 94 and a resistance 95. In the particular arrangement shown if the level of the ($t_1-t_2$) output is high then the higher charge on capacitor 90 is used to raise the charge on capacitor 91, thus boosting the reference voltage of circuit 7. Therefore any additional charge added via the input terminals of circuit 7 will result in a higher total charge on capacitor 91. A similar arrangement is used to boost the reference voltage of circuit 6 if the ($t_2-t_3$) output is high. The rate and extent of boosting are controlled by the components 93, 94, 95 and any combination thereof may be used.

In each of the circuits of FIG. 1 additional components may be added in accordance with normal circuit practice. For example, those circuits illustrated by FIGS. 5 and 6 may include inverter follower stages 54 and 66 respectively while FIG. 8 can include emitter follower stages 83 and 86. FIG. 6 shows the inclusion of an isolating diode 65 in the threshold voltage supply.

It is to be understood that the foregoing description of specific examples of this invention is made by way of example only and is not to be considered as a limitation on its scope.

I claim:

1. Apparatus for analyzing complex signal waveforms wherein the number of zero-crossings of an input signal waveform in a given period is an indication of the frequency of the signal waveform, the apparatus comprising:

means for dividing the signal into at least first and second frequency ranges including means for setting a first and second time period within which a succeeding zero-crossing may occur, such that a zero-crossing falling within said first period lies in said first range and a zero-crossing falling within said second period lies within said second range;

digital filter circuit means coupled to said dividing means to produce a first stream of pulses indicating those zero-crossings occurring within said first period and a second stream of pulses indicating those zero-crossings occurring within said second period;

difference integrator circuit means coupled to receive said first and second stream of pulses and produce first and second weighted difference outputs indicating the weighted difference between said first and second stream of pulses; and decision circuit means responsive to said first and second difference outputs to provide first and second binary outputs indicative of the largest of said difference outputs whenever said difference outputs exceed a predetermined threshold level.

2. The apparatus of claim 1 including means for integrating said binary outputs and comparing them to said threshold level to ensure significance of said binary outputs.

3. The apparatus of claim 2 including means for altering the boundaries of said first and second frequency ranges.

4. The apparatus of claim 2 wherein said difference integrator circuit means includes means for varying a reference level for said first frequency range relative to said second frequency range.

References Cited

UNITED STATES PATENTS

| | | |
|---|---|---|
| 3,162,808 | 12/1964 | Haase. |
| 3,278,685 | 10/1966 | Harper. |
| 3,344,233 | 9/1967 | Tufts. |
| 3,376,386 | 4/1968 | Fant. |
| 3,394,309 | 7/1968 | Duscheck. |
| 3,400,216 | 9/1968 | Newman. |
| 3,416,080 | 12/1968 | Wright et al. |

WILLIAM C. COOPER, Primary Examiner

C. W. JIRAUCH, Assistant Examiner

U.S. Cl. X.R.

324—77